United States Patent Office 2,697,046
Patented Dec. 14, 1954

2,697,046

MOISTURE PERMEABLE CELLULOSE ACETATE COMPOSITION

John D. Brandner, Wilmington, Del., assignor to Atlas Powder Company, Wilmington, Del., a corporation of Delaware No Drawing. Application October 31, 1950,
Serial No. 193,299

5 Claims. (Cl. 106—181)

This invention relates to cellulose acetate compositions and more particularly to plasticized cellulose acetate films.

It is an object of the invention to provide novel plasticized cellulose acetate compositions.

It is a further object to provide plasticized self-sustaining films of cellulose acetate.

A still further object is to provide wrapping films of plasticized cellulose acetate which freely transpire moisture vapor.

Another object is to provide moisture permeable films of cellulose acetate which are non-odorous, non-toxic and tasteless.

The above objects are accomplished by providing cellulose acetate compositions, and sheets or films of such compositions, plasticized with a monophenyl ether of a polyethylene glycol containing from 4 to 6 oxyethylene groups, or with a mixture of such an ether and another solvent plasticizer wherein the said ether makes up at least 50% of the total plasticizer. Various types of solvent plasticizers are known among which may be named dimethyl phthalate, diethyl phthalate, dibutyl tartrate, tricresyl phosphate, methyl phthalyl ethyl glycollate, and the like. In addition to the cellulose acetate and plasticizer, the compositions of the invention may contain other ingredients such as solvents to aid in film casting, dyes or pigments to color the product or decrease its transparency, and the like.

Any grade of cellulose acetate suitable for forming wrapping films and sheets may be employed in practicing the present invention. In general, it is preferred to employ cellulose acetate of 37 to 42% acetyl content and a viscosity (by ASTM Method D871–46T) of 20 to 100 seconds.

The monophenyl ethers of polyethylene glycols containing from 4 to 6 oxyethylene groups per mol are known compounds and may be prepared by condensing the appropriate polyethylene glycol with a phenol according to classical methods. Preferably, however, the said ethers are prepared by the reaction of ethylene oxide with phenol in molecular proportions of from 4 mols of ethylene oxide per mol of phenol to 6 mols of ethylene oxide per mol of phenol. It is well recognized that this method of preparation yields products which are mixtures of polyglycol ethers of phenol differing only in the number of oxyethylene groups per mol, and that in general there is full equivalence between the ether containing a given number of oxyethylene groups per mol and the mixture of ethers obtained by adding that number of mols of ethylene oxide per mol of phenol, and the two expressions will be used interchangeably herein. The preferred phenol-ether plasticizer is that containing 4 oxyethylene groups per mol.

The proportions of cellulose acetate to total plasticizer in the compositions of the present invention may vary over a considerable range according to the desired flexibility and extensibility of the product, the nature of the cellulose acetate employed and the composition of the plasticizer itself. In general, however, useful compositions will be found among those containing from 5% to 25% of the novel phenyl ether-plasticizers hereinbefore disclosed, from 0 to 17.5% of a solvent plasticizer, the actual values within said ranges being chosen so that their sum lies between the limits of 10% and 35% and the proportion of said ether is at least 50% of said sum. Thus, when a phenyl ether of the invention is the sole plasticizer, its content in the plasticized cellulose acetate composition is from 10% to 25% based on the sum of cellulose acetate and plasticizer and, when a mixture of a phenyl ether and a solvent plasticizer are employed the plasticizer content may be from 10% to 35%.

Compositions illustrating the range of proportions described and suitable when provided in film forms as wrapping materials which readily transpire moisture vapor are presented in tabular form below. In each case the remainder of the composition to a total of 100% is cellulose acetate. The percentages are by weight.

| Example No. | Phenyl-Glycol Ether | Auxiliary Plasticizer |
|---|---|---|
| 1 | 25% C$_6$H$_5$(OC$_2$H$_4$)$_4$OH | None. |
| 2 | 15% C$_6$H$_5$(OC$_2$H$_4$)$_4$OH | 15% Di ethyl phthalate. |
| 3 | 20% C$_6$H$_5$(OC$_2$H$_4$)$_5$OH | 15% Di methyl phthalate. |
| 4 | 10% C$_6$H$_5$(OC$_2$H$_4$)$_5$OH | 10% Tri cresyl phosphate. |
| 5 | 10% C$_6$H$_5$(OC$_2$H$_4$)$_6$OH | None. |

Excellent films may be prepared by dissolving cellulose acetate and a plasticizer as disclosed hereinbefore in a suitable solvent, spreading the solution thus formed in a uniform film on a glass plate, evaporating part of the solvent, stripping the film from the glass and expelling the remainder of the solvent.

The following examples illustrate the casting of films in accordance with the invention.

Example 6

A stock solution was prepared by dissolving 540 grams of cellulose acetate having a combined acetic acid content of 55.6 to 56.2 per cent and a viscosity of 35 to 55 seconds in a solvent composed as follows:

| | Grams |
|---|---|
| Methyl ethyl ketone | 600 |
| Ethyl acetate | 390 |
| Dioxane | 570 |
| Acetone | 900 |

5.4 grams of the mono phenyl ether of tetraethylene glycol were incorporated as plasticizer into 100 grams of the stock solution and cast on glass plates in films of 0.022 inch wet thickness. The films were allowed to dry over night in a solvent atmosphere, then air dried for 24 hours, removed from the glass and conditioned for 48 hours at 77° F. and 50% relative humidity. The resulting film had a thickness of 0.002 inch and was transparent, odorless, and very flexible. It was found to be quite permeable to moisture vapor.

Example 7

Example 6 was repeated except that one-half of the mono phenyl ether of tetraethylene glycol was replaced by diethyl phthalate. The resulting film was essentially indistinguishable from that of Example 6 except that it was somewhat less permeable to moisture vapor.

Example 8

To 100 grams of the stock solution of Example 6 were added 4.5 grams of diethyl phthalate and 4.5 grams of the monophenyl ether of tetraethylene glycol. A film was cast by the technique described in Example 6. It was exceedingly flexible and extensible, and exhibited high moisture vapor permeability.

Films or sheets of plasticized cellulose acetate in accordance with the present invention may be prepared by any of several known techniques other than the one described in detail in the preceding examples. The acetate and plasticizer may be mixed on hot rolls and the molten mass cast as a film on a moving belt or by extrusion through a slit. Alternatively, a viscous solution of cellulose acetate and the plasticizer in a volatile solvent such as acetone may be prepared and extruded in a sheet under conditions whereby the solvent is rapidly evaporated, as by a current of heated air. The invention is not limited to any particular method of sheet or film formation nor to any particular method of incorporation of the components of the composition. The invention resides in a composition of matter the essential components of which are cellulose acetate and a plasticizer as defined in the following claims.

What is claimed is:

1. As a composition of matter, cellulose acetate and a plasticizer therefor, said plasticizer comprising from 10% to 35% by weight of the sum of cellulose acetate and plasticizer, wherein at least half of said plasticizer is a monophenyl ether of a polyethylene glycol containing from 4 to 6 oxyethylene groups and the balance is another solvent plasticizer for cellulose acetate, and wherein the said ether constitutes not more than 25% of the said sum.

2. A composition of matter as in claim 1 wherein the said solvent plasticizer is a diester of phthalic acid and an alkanol containing not more than 2 carbon atoms.

3. A composition as in claim 1 wherein the said balance is zero.

4. A composition as in claim 3 wherein the cellulose acetate is characterized by an acetyl content of from 37% to 42% and a viscosity of from 20 to 100 seconds and wherein the ether is the monophenyl ether of tetraethylene glycol.

5. A cellulose acetate wrapping foil consisting essentially of from 75% to 90% of cellulose acetate characterized by an acetyl content of 37% to 42% and a viscosity of 20 to 100 seconds, and, as a plasticizer therefor, from 25% to 10% of the mono phenyl ether of tetraethylene glycol.

References Cited in the file of this patent

UNITED STATES PATENTS

| Number | Name | Date |
| --- | --- | --- |
| 1,957,878 | Carroll | May 8, 1934 |
| 2,397,320 | Koch | Mar. 26, 1946 |

FOREIGN PATENTS

| Number | Country | Date |
| --- | --- | --- |
| 548,293 | Great Britain | Oct. 5, 1942 |